Feb. 6, 1934.  C. G. SUITS  1,946,297

ALTERNATING CURRENT CONTROL APPARATUS

Filed April 26, 1933

Inventor:
Chauncey G. Suits,
by Charles E. Tullar
His Attorney.

Patented Feb. 6, 1934

1,946,297

UNITED STATES PATENT OFFICE 1,946,297

ALTERNATING CURRENT CONTROL APPARATUS

Chauncey G. Suits, Schenectady, N. Y., assignor to General Electric Company, a corporation of New York Application April 26, 1933. Serial No. 668,076

12 Claims. (Cl. 171—97)

My invention relates to alternating current control apparatus and particularly to alternating current circuits employed for the supply and control of electric illuminating of the type in which the intensity undergoes regularly recurring variations of a predetermined character, such for example as in electric signs, electrically illuminated fountains, etc. In such installations standard incandescent lamps usually are employed as the source of light and the variation in the illumination produced thereby is effected by increasing or decreasing the current supply in the appropriate manner. One object of my invention is the provision of improved apparatus of this character having means by which an adjustment may be made of the rate of increase of the supply current. Another object is the provision of such apparatus having means by which an adjustment may be made of the rate of decrease of the supply current. A further object of my invention is the provision of a plurality of units of apparatus of this character arranged for sequence operation having means by which an adjustment may be made of the relative times of occurrence of similar current changes in the respective units.

My invention will be better understood from the following description taken in connection with the accompanying drawing, and its scope will be pointed out in the appended claims.

Figure 1:
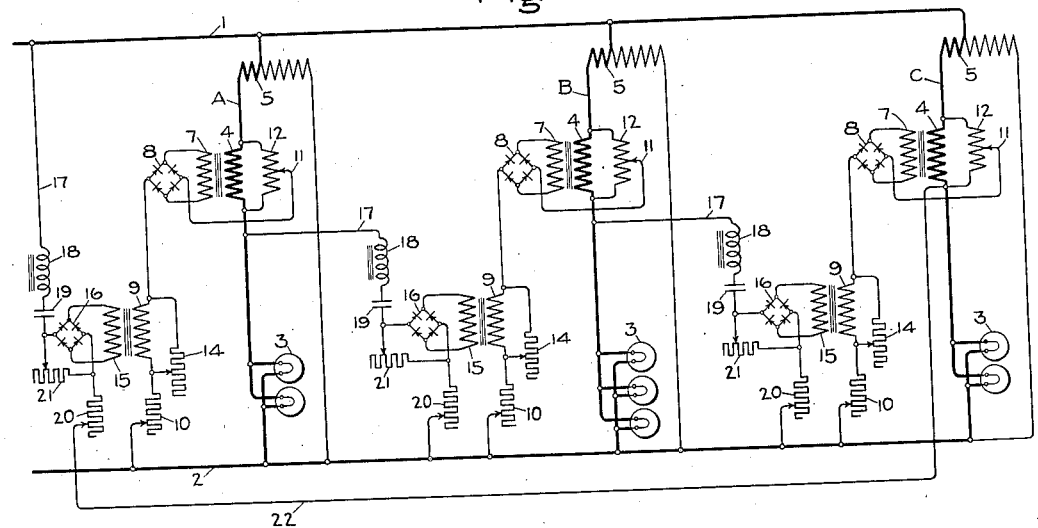

In the drawing, Fig. 1 is a circuit diagram illustrating one embodiment of my invention; and Figs. 2 to 5 inclusive are diagrams showing the operation of the several load circuits of Fig. 1 under various conditions of adjustment.

Referring to Fig. 1, a source of supply of alternating current which for example may be a 110 volt, 60 cycle lighting circuit is shown at 1 and 2 to which are connected a number of branch load circuits, three in the present case, and denoted by the letters A, B, and C. Inasmuch as the three branch or load circuits A, B, and C are alike I shall describe in detail only circuit A. This circuit includes the load 3, which for example may be one or more incandescent lamps, and a saturable core reactor 4. In order to compensate for voltage drop in the reactor 4 so that standard lamps may be employed as the load and operated from a standard voltage source of supply I have shown branch circuit A connected with the source of supply through the auto-transformer 5 which it will be understood acts as a voltage booster. The reactor 4 is provided with the saturating winding 7 which is supplied with rectified current from the full wave rectifier 8. The input of this rectifier connects at one side through the saturable core reactor 9 and the ballasts rheostat 10 with conductor 2 of the supply circuit, and connects at the other side with the arm 11 of the potentiometer 12 which is bridged across reactor 4. If desired the potentiometer 12 may be dispensed with and the rectifier 8 connected with suitable taps brought out from the winding of the reactor 4. This arrangement is disclosed and claimed in my copending application Serial No. 648,662 filed December 23, 1932. As so arranged the current supplied to the saturating winding 7 is responsive to the voltage drop across the load 3 and a portion of reactor 4 under the control of the reactor 9. By varying the position of the arm 11 of the potentiometer 12 I am able to vary the rate at which the current increases in the load 3. In shunt with the reactor 9 is the rheostat 14 and by varying this rheostat I am able to vary the response made by reactor 9 to changes in its saturation and as a result I can change the rate at which the current decreases in the load 3. The saturating winding 15 of reactor 9 is supplied with rectified current from the full wave rectifier 16. This rectifier is supplied with alternating current through the non-linear resonant circuit 17 which includes the saturable core reactor 18, shown as the self saturating type, the capacitor 19, rheostat 20 and rheostat 21 in shunt with the rectifier. The non-linear resonant circuit 17 connects between conductor 1 of the supply circuit and through conductor 22 with branch circuit C at a point between the reactor 4 and the load 3 of that circuit. Hence circuit 17 is responsive to the voltage across the reactor 4 of branch circuit C. The non-linear resonant circuit 17 is so constructed that when the impedance offered by reactor 4 due to saturation thereof in circuit C is a minimum the circuit is not resonant but when this reactor has a maximum impedance the circuit 17 becomes resonant. Branch circuits B and C and the control circuits associated therewith are like branch circuit A and the control circuits associated with it respectively with the exception that the non-linear circuits 17 of branch circuits B and C are each connected across the load of the previous branch circuit in the series. Hence each circuit 17 becomes resonant in response to the illumination of the lamps of the previous branch circuit. Such a sequence arrangement is disclosed and claimed in my copending application Serial No. 582,801 filed December 23, 1931.

As a result of this arrangement the load lamps of circuits A, B, and C become illuminated in succession, the lamps of the successive circuits becoming illuminated and also becoming extinguished in a definite sequence with a predetermined time delay depending upon the operation of the saturable core reactors and the non-linear circuits associated therewith. Supposing for example that the reactor 4 of each branch circuit A, B, and C is in a relatively non-saturated condition and the lamps in those circuits are dark by reason of the relatively high impedance of the reactors 4. Because of the high impedance of reactor 4 in circuit C the voltage applied through conductor 22 to the non-linear circuit 17 is a maximum and this circuit now becomes resonant. Current is thereby supplied through the rectifier 16 to the saturating winding 15 whereby reactor 9 becomes saturated and offers a lower impedance to the circuit by which current is supplied through rectifier 8 to the saturating winding 7 of the main reactor 4. This reactor now becomes saturated and the resulting decrease in impedance is followed by the illumination of lamps 3 in circuit A. The increased potential drop across lamps 3 of circuit A now causes the non-linear circuit 17 of branch B to become resonant which in the same manner as already described operates through the reactor 9 to cause the saturation of reactor 4 in branch circuit B whereupon the lamps 3 of circuit B become illuminated. In the same manner the lamps of circuit C subsequently become illuminated. As a result of the saturation of reactor 4 in branch C the voltage applied to the non-linear circuit 17 of branch A through conductor 22 is decreased whereupon circuit 17 becomes non-resonant. Accordingly the saturation of reactor 9 is reduced and following this the saturation of reactor 4 in circuit A is reduced whereupon the impedance offered by reactor 4 increases to such a value that the lamps 3 in that circuit are extinguished. The resulting decrease in voltage drop across lamps 3 of circuit A causes the non-linear circuit associated with circuit B to become non-resonant which acting through the reactors 9 and 4 associated with circuit B in an obvious manner causes lamps 3 associated with circuit B to become extinguished. Likewise lamps 3 associated with branch circuit C also subsequently become extinguished. The cycle thereupon repeats itself and continues to do so indefinitely, it being noted that the apparatus operates automatically and without the use of any mechanism depending upon the operation of relatively moving parts.

By raising and lowering the arm 11 of potentiometer 12 the rate at which the lamps associated therewith increase in brilliancy may be varied at will. For example, if the potentiometer arm 11 is high, that is, the control circuit includes a relatively large amount of reactor 4, the rate of increase in the illumination of lamps 3 will be rapid whereas if the arm 11 is low the rate of increase of illumination will be slow. The rate at which the illumination of the lamps of any branch decreases may be varied by changing the adjustment of the rheostat 14; that is, if the amount of resistance included by the rheostat is large the rate of decrease of the illumination will be rapid and conversely if the resistance is small the rate of decrease will be slow. I am also able to adjust the relative time at which the lamps of the several circuits are extinguished by adjusting the rheostat 20. If the resistance included by rheostat 20 is large the time interval between the successive extinguishing of the lamps of the several circuits is short, but if the resistance of rheostat 20 is small there will be a greater time interval between the extinguishing of the successive lamps of the series.

Figure 2:
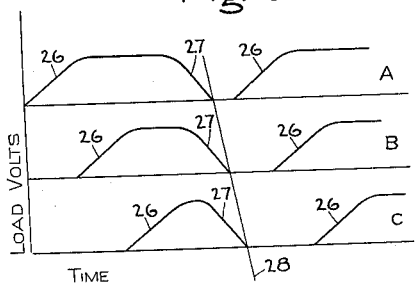

To make more clear the effect of these several adjustments I have shown the diagrams comprising Figs. 2 to 5 which represent the time-load volts curves for the lamps of each of circuits A, B, and C. In Fig. 2 the setting of 11 is high, 14 is large, and 20 is large, in the case of all three branch circuits. Because 11 is high the rate of increase of the load current in each branch circuit is rapid as shown by the relatively steep slope of the curves at 26. Because 14 is large the rate of decrease of load current in each of the branch circuits is rapid as shown by the relatively steep slope of the part 27 of the curves. Because 20 is large there is a relatively short time interval between the extinguishing of the successive lamps of the several circuits, this being indicated by the steep slope of line 28.

Figure 4:
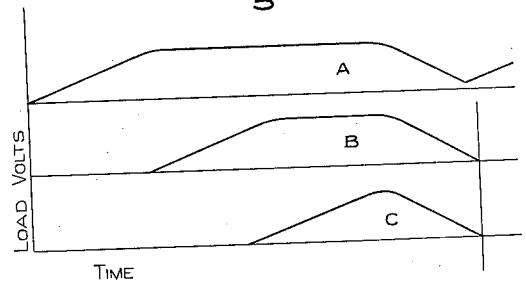
Figure 3:
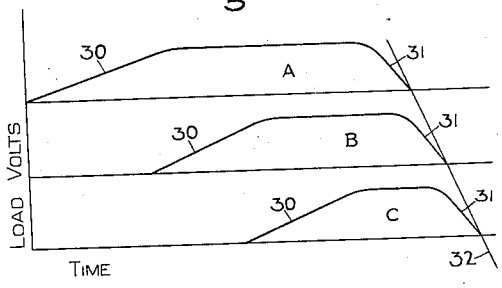

In Fig. 3, 11 is low, 14 is large, and 20 is small. Because 11 is low the rate of increase in load current in each of the branch circuits is relatively slow as shown by the gradual slope 30 of each curve. Because 14 is large the decrease rates are rapid as shown by the steep slopes 31 as in Fig. 2, and because 20 is small there is a relatively large time interval between the extinguishing of the successive lamps as shown by the greater slope of line 32. In Fig. 4, 11 is low, 14 is small, and 20 is large. From what has been explained above it is thought that the reasons for the curves shown in this figure will be obvious and a detailed explanation thereof unnecessary.

Figure 5:
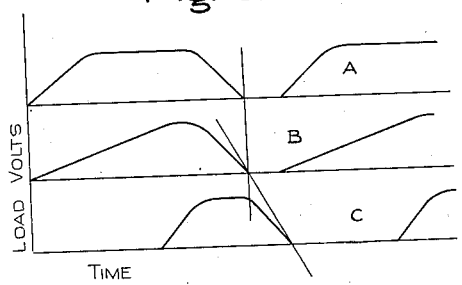

In Fig. 5 curves for a slightly modified arrangement are illustrated, the difference being that the non-linear circuit 17 associated with branch circuit B instead of being connected to branch A is connected in parallel with the non-linear circuit 17 associated with circuit A. Circuits A and B therefore operate in response to a common control. In this case 11 is high and 14 is large as associated with circuit A; 11 is low, 14 is large, and 20 is large as associated with circuit B; and 11 is high, 14 is large, and 20 is small as associated with circuit C. Because the non-linear control circuits of A and B are operated in parallel, the load currents of circuits A and B as shown in Fig. 5 begin to increase and terminate at the same time. From the explanation that has already been given in connection with Figs. 2 and 3 it is thought that the curves shown in this figure will be clearly understood and no further explanation will be required.

While I have illustrated only a few of the various combinations which may be produced, it is obvious that a great many other combinations may be produced at the will of the operator by variously adjusting the potentiometer arms 11 and the rheostats 14 and 20.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. In combination, an alternating current circuit including a saturable core reactor for controlling the current thereof and a circuit derived from said circuit and including a fractional part of said reactor for controlling the saturation of the reactor.

2. In combination, an alternating current circuit including a saturable core reactor having a saturating winding and a control circuit for said winding derived from said circuit and including a fractional part of said reactor.

3. In combination, an alternating current circuit including a saturable core reactor for controlling the current thereof, a circuit derived from said circuit and including a fractional part of said reactor for controlling the saturation of the reactor and means for varying the fractional part of the reactor included in the control circuit.

4. In combination, an alternating current circuit, a saturable core reactor therein, means for effecting a decrease in the saturation of said reactor whereby the current in the circuit rises and means for varying the rate of rise of said current.

5. In combination, an alternating current circuit, a saturable core reactor therein, means including a circuit derived from said circuit for effecting a decrease in the saturation of the reactor whereby the current in the alternating current circuit increases and means for including a fractional part of said reactor in said derived circuit.

6. In combination, an alternating current circuit, a saturable core reactor therein, means including a circuit derived from said circuit and including a fractional part of said reactor for effecting a decrease in the saturation of the reactor whereby the current in the alternating current circuit increases and means for varying the fractional part of the reactor included in the derived circuit.

7. In combination, an alternating current circuit including a load and a saturable core reactor having a saturating winding, a supply circuit for said winding connected across said load and a portion of said reactor and means for varying the portion of said reactor included in the supply circuit.

8. In combination, an alternating current circuit including a saturable core reactor, means for reducing the saturation of the core of said reactor whereby the current in said circuit decreases and means associated with said means for varying the rate of decrease of said current.

9. In combination, an alternating current circuit including a saturable core reactor having a saturating winding, a supply circuit for said winding, means for increasing the impedance of the supply circuit to cause a decrease in the current of the alternating current circuit and means for limiting said increase in impedance whereby the rate of decrease of said current is controlled.

10. In combination, a main alternating current circuit including a saturable core reactor having a saturating winding, a supply circuit for said winding including a device for increasing the impedance of the supply circuit whereby the current in the main circuit decreases, and a variable impedance device in shunt with said device for regulating the rate of decrease of said current.

11. A sequence operation system comprising a plurality of similar alternating current circuits forming a series and each including a saturable core reactor, a circuit for controlling the saturation of each reactor in response to the current in preceding circuit of the series, and means in said controlling circuits for varying the relative times of the sequence operation in the several alternating current circuits.

12. A sequence operation system comprising a plurality of similar alternating current circuits forming a series and each including a load device and a saturable core reactor for causing the current therein to increase and decrease, means associated with each circuit for controlling the saturation of the reactor therein in response to the operation of the preceding circuit of the series, means for varying the rate of increase of current in each circuit, means for varying the rate of decrease of current in each circuit and means for varying the relative times that corresponding changes take place in the respective circuits of the series.

CHAUNCEY G. SUITS.